United States Patent
Cox et al.

(10) Patent No.: US 8,944,468 B2
(45) Date of Patent: Feb. 3, 2015

(54) SEAT BELTS

(76) Inventors: Graham Edward Cox, Old Basing (GB); Ronald Sidney Cox, Old Basing (GB)

(*) Notice: Subject to any disclaimer, the term of this patent is extended or adjusted under 35 U.S.C. 154(b) by 0 days.

(21) Appl. No.: 13/512,060

(22) PCT Filed: Nov. 26, 2010

(86) PCT No.: PCT/GB2010/051975
§ 371 (c)(1),
(2), (4) Date: May 30, 2012

(87) PCT Pub. No.: WO2011/064593
PCT Pub. Date: Jun. 3, 2011

(65) Prior Publication Data
US 2012/0240358 A1 Sep. 27, 2012

(30) Foreign Application Priority Data
Nov. 27, 2009 (GB) .................................. 0920806.7

(51) Int. Cl.
| | | |
|---|---|---|
| B60R 22/00 | (2006.01) | |
| A44B 11/04 | (2006.01) | |
| B60R 22/18 | (2006.01) | |
| A44B 11/25 | (2006.01) | |

(52) U.S. Cl.
CPC .............. *B60R 22/18* (2013.01); *A44B 11/2561* (2013.01); *B60R 2022/1812* (2013.01)
USPC ......................................... 280/801.1; 297/468

(58) Field of Classification Search
CPC .............. B60R 22/1855; B60R 22/185; B60R 2022/1812; B60R 2022/18; A44B 11/2561
USPC ............... 280/808, 801.1; 297/468, 482, 483; 24/265 BC, 265 R, 164, 163 FC, 68 SB
See application file for complete search history.

(56) References Cited

U.S. PATENT DOCUMENTS

| | | | |
|---|---|---|---|
| 4,023,826 A | | 5/1977 | Kokubo et al. |
| 4,069,554 A | | 1/1978 | Minolla et al. |
| 4,551,889 A | | 11/1985 | Narayan et al. |
| 4,901,407 A | * | 2/1990 | Pandola et al. .................. 24/633 |
| 4,903,377 A | * | 2/1990 | Doty .............................. 24/194 |

(Continued)

FOREIGN PATENT DOCUMENTS

| | | | | |
|---|---|---|---|---|
| DE | 27 41 297 | | 3/1979 | |
| JP | 01223902 A | * | 9/1989 | ............. A44B 11/25 |

(Continued)

OTHER PUBLICATIONS

International Search Report dated Feb. 28, 2012, in counterpart International Patent Application No. PCT/GB2010/051975 (2 pages, in English).

*Primary Examiner* — Keith Frisby
(74) *Attorney, Agent, or Firm* — NSIP Law

(57) ABSTRACT

A tongue or tongue cover to envelop a plastic part of a seat belt tongue of a seat belt. The tongue or tongue cover includes a webbing engagement projection useful to resist unwanted slackening of the lap belt portion of the seat belt while in use.

17 Claims, 17 Drawing Sheets

(56) References Cited

U.S. PATENT DOCUMENTS

| | | | |
|---|---|---|---|
| 5,309,606 A * | 5/1994 | Kawamura | 24/196 |
| 7,871,132 B2 * | 1/2011 | Rogers | 297/469 |
| 8,037,581 B2 * | 10/2011 | Gray et al. | 24/163 R |
| 8,087,696 B2 * | 1/2012 | Mather et al. | 280/807 |
| 8,418,324 B2 * | 4/2013 | Ito | 24/198 |
| 2003/0234530 A1 * | 12/2003 | Moskalik et al. | 280/801.1 |
| 2006/0090312 A1 * | 5/2006 | Ichida et al. | 24/633 |
| 2006/0097503 A1 * | 5/2006 | Kiyomizu et al. | 280/801.1 |
| 2007/0039144 A1 * | 2/2007 | Ichida et al. | 24/633 |
| 2007/0050953 A1 * | 3/2007 | Versellie et al. | 24/265 R |
| 2009/0295138 A1 * | 12/2009 | Cox et al. | 280/801.1 |

FOREIGN PATENT DOCUMENTS

| | | | | |
|---|---|---|---|---|
| JP | 2001010444 A | * | 1/2001 | B60R 22/12 |
| JP | 2001-315616 | * | 11/2001 | B60R 22/12 |
| JP | 2009-113532 | * | 5/2009 | B60R 22/12 |
| JP | 2009-166586 | * | 7/2009 | B60R 22/12 |

\* cited by examiner

SEAT BELTS

The present invention relates to covers for seat belt tongues, and to seat belt tongues.

Figure 1:
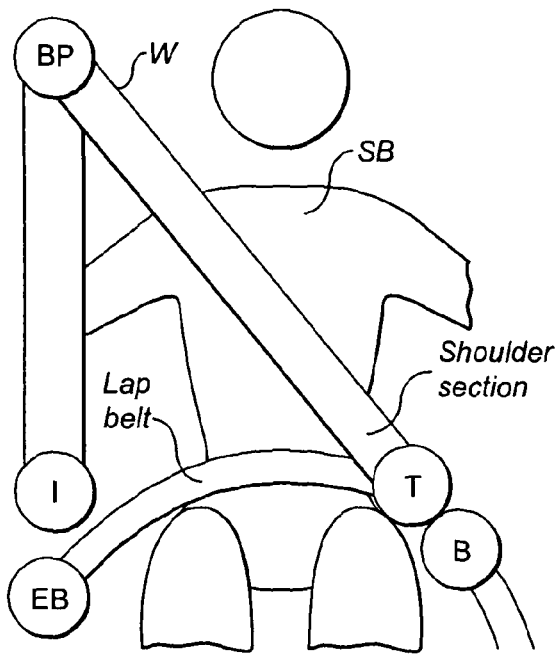

FIG. 1 shows a typical configuration of a known three point inertia vehicle seat belt SB comprising a webbing W, an inertia reel I, a B-pillar BP, a tongue T, a buckle B and an end bracket EB. The webbing W is retractably connected to the inertia reel I, and extends from the inertia reel I up through the B-pillar BP, usually positioned adjacent to a user's shoulder. The webbing then passes through a webbing slot WS in the tongue T and then on to the end bracket EB. The buckle B is usually positioned adjacent to a user's hip on the opposite side of the user to the B-pillar BP.

Figure 2:
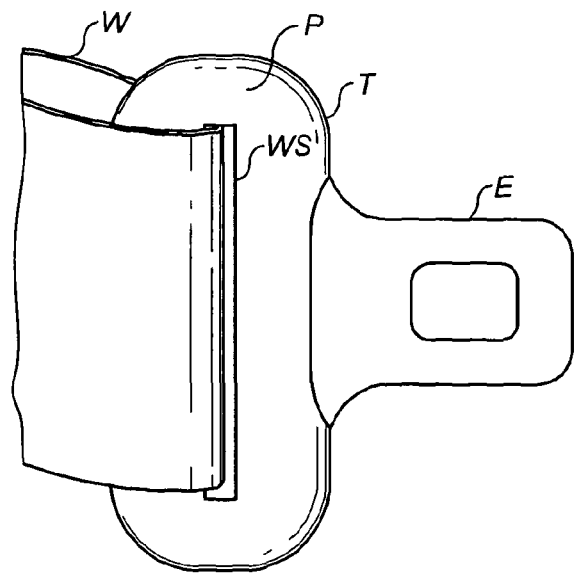

FIG. 2 shows a typical tongue T for engaging with the buckle B. The tongue T comprises a piece of plastic P moulded around a stainless extension E. The webbing slot WS is formed through both tongue T to enable the tongue T to be moved along the webbing W. To use the seat belt SB a user grasps the tongue T (usually the plastic part P thereof) to draw the webbing W from the inertia reel I. The user then fastens the tongue T to the buckle B using the extension E.

Proper use of the inertia reel seat belt involves the user (i) sitting well back in the seat, (ii) buckling up, ensuring the webbing is not twisted and the lap belt is laying across the hip bone (not the stomach) and (iii) removing the slack from the lap belt portion by gently pulling up on the shoulder section of the seatbelt webbing. A major problem with seat belts is that the lap belt portion of the seat belt tends to slacken over time when in use, which may lead to the seat belt webbing moving from the optimum position for safety (moving from over the hip bone, to across the stomach) and comfort. This is particularly relevant for the type of seatbelt shown in FIG. 1 where the job of maintaining belt tension is done by the retraction mechanism in the inertia reel after the occupant removes the lap belt slack by gently pulling up on the shoulder section of the webbing. Persons wearing a seat belt with slack in the lap belt portion are typically at increased risk of injury and also are likely to take on a poor posture with the lower portion of the spine not aligning with the lumbar support of the vehicle seat. This poor posture or 'slouched' position often leads to lower back pain. Any vehicle collision with a seat belt with slack in the lap belt can lead to bruising of the stomach, internal bleeding/organ damage and in severe cases, the occupant may 'submarine' under the seatbelt, drastically reducing the efficiency of safety features of the vehicle such as airbags. On rollover, a slack lap belt can lead to significantly higher head movement towards the inner roof of the vehicle, leading to significantly higher chance of serious injury or death. Maintaining the tension on the lap belt is therefore desirable for maximum safety in any vehicle equipped with regular inertia reel seat belts.

It is an aim of an embodiment of the present invention to address problems associated with seat belts, whether identified herein or otherwise.

According to the present invention in a first aspect, there is provided a cover for a seat belt tongue, the cover having: an elastically deformable body having means for holding the cover on the seat belt tongue, and further comprising a webbing engagement projection arranged to contact seat belt webbing when the seat belt is fastened in use and to thereby provide a resistance to drawing of the seat belt webbing through the seat belt tongue.

The deformable body may be stretched, in use, to be elastically fitted to the seat belt tongue. The deformable body suitably comprises a reinforcing section. Suitably the reinforcing section comprises a resilient inner or core of the body. Suitably, the means for holding has a first hooked portion for hooking around the seat belt tongue to hold the cover in position. Suitably, the means for holding has a second hooked portion. Suitably, the first and/or second hooked portion is elastically deformable to fit around a seat belt tongue.

Suitably, the first and second hooked portions are located at opposite end regions of the body. Suitably, the means for holding has a channel for receiving and holding the seat belt tongue. Suitably, the means for holding comprises, at least in part, the reinforcing section. Suitably, the channel is defined in the reinforcing section. Suitably, in use, the channel is arranged to hold an edge region of the seat belt tongue and the hooked portion is, or the first and second hooked portions are, arranged to hold the opposite edge region of the seat belt tongue. Suitably, the means for holding has a securement means for, in use, holding the cover on the tongue. Suitably, the securement means is located in end regions of the first and second hooked portions. Suitably, the securement means has a strap and a fastening means to hold the cover on the tongue. Suitably, the fastening means includes an aperture on the strap and a protrusion extending from one of the hooked portions; wherein the protrusion is located through the aperture to secure the strap. Suitably, the body has a first textured region for being gripped by a user. Suitably, the first textured region has a compressible element. Suitably, the first textured region has an elastically compressible element. Suitably, the first textured region has a plurality of compressible elements. Suitably, each compressible element is a protrusion extending from the body. The protrusion may be one of a nodule, a rib or a ridge. Suitably, the body has a second textured region distinct from the first textured region. Suitably, the second textured region has the features described for the first textured region. Suitably, the first and second textured regions are separated by an intermediate region. Suitably, first and second textured regions are arranged at an edge region of the body. Suitably the intermediate region is provided in region at which the webbing of seat belt will run when the cover is in place on a seat belt tongue. Suitably, the webbing engagement projection is provided at the intermediate region.

Suitably, the webbing engagement projection comprises a friction surface. Suitably, the friction surface comprises one or more compressible elements. Suitably, the friction surface comprises one or more elastically compressible elements. Suitably, the or each compressible element is a protrusion extending from the webbing engagement projection. The or each protrusion may be one of a nodule, a rib or a ridge Suitably, the webbing engagement projection is of similar or equal width to the webbing.

Suitably, the webbing engagement projection comprises a wedging member arranged to be drawn between the webbing and a webbing slot of the tongue, and to wedge therebetween.

Suitably, in cross section the webbing engagement projection comprises a narrower portion arranged in use to lie close to a webbing slot in the tongue through which the webbing passes, and a wider portion arranged further away from the webbing slot than the narrower portion. Suitably, the webbing engagement projection in cross section tapers between the narrower portion and the wider portion. Suitably the webbing engagement projection comprises a wider portion that tapers to a narrow portion, the wider portion, narrow portion and taper being provided on a webbing engagement projection base. Suitably, the webbing engagement projection base provides a generally planar surface from which the taper and wider portion extend. Suitably, the generally planar surface lies generally parallel to a plane in use contains the seat belt tongue. Suitably, the webbing engagement projection is arranged in use to contact the lap belt portion of the seatbelt.

Suitably, the cover comprises a webbing engagement projection arranged in use to contact the shoulder section of the seat belt. Suitably, the webbing engagement projection is integral with the deformable body. Suitably, the webbing engagement projection comprises the same material as the deformable body. Suitably, the webbing engagement projection is an extension of the deformable body. Suitably, the webbing engagement projection is formed with the deformable body as a one-piece moulding. Suitably, the webbing engagement projection comprises no user actuatable parts. Suitably, the webbing engagement portion does not obstruct passage of the webbing through a webbing slot in the tongue, through which the webbing passes, when the webbing is arranged in a plane parallel to and passing through the webbing slot but perpendicular to the tongue body. Suitably, the webbing engagement projection serves to narrow the range of angles through which the webbing can be passed unhindered through the webbing slot. Suitably, the webbing engagement projection defines a webbing engagement angle to the webbing slot, at which the webbing engagement projection contacts the webbing. Suitably, the webbing engagement angle is a smaller angle than the angle at which the tongue would contact the webbing, absent the cover and the webbing engagement projection. Suitably, the cover is shaped and dimensioned to allow the seat belt tongue to be moved uninhibited relative to webbing of a seat belt when in place on a seat belt tongue and when the tongue and webbing are arranged at an angle smaller than the webbing engagement angle. Suitably, the engagement angle is less than 30 degrees, preferably less than 25 degrees, more preferably less than 20 degrees, and still more preferably less than 15 degrees. Suitably, the engagement angle is greater than 5 degrees, preferably greater than 10 degrees, more preferably greater than 15 degrees.

Suitably, the cover comprises one or more secondary belt retaining features, arrangeable in use to urge the webbing toward contact with the webbing engagement projection. Suitably, the cover comprises a secondary belt retaining feature arrangeable in use to urge the lap belt portion of seat belt webbing toward contact with the webbing engagement projection. Suitably, the secondary belt retaining feature comprises a strap to elastically urge the webbing toward contact with the webbing engagement projection. Suitably, the secondary belt retaining feature is arrangeable in an open configuration in which does not urge the webbing toward contact with the webbing engagement projection, and a closed position in which does urge the webbing toward contact with the webbing engagement projection. Suitably, the secondary belt retaining feature is integral with the cover. Suitably, the secondary belt retaining feature comprises the same material as the cover. Suitably, the secondary belt retaining feature is an extension of the cover. Suitably, the secondary belt retaining feature is formed with the cover as a one-piece moulding. Suitably, the cover comprises a webbing engagement portion on both sides thereof. Suitably, the cover comprises a secondary belt retaining feature in both sides thereof. Suitably, the webbing engagement projection is arranged to contact seat belt webbing when the seat belt is fastened in use and to provide a resistance to drawing of the seat belt webbing through the seat belt tongue by engaging a shoulder section of the seatbelt webbing. Suitably, the webbing engagement projection is arranged to contact seat belt webbing when the seat belt is fastened in use and to provide a resistance to drawing of the seat belt webbing through the seat belt tongue by engaging a shoulder section of a three-point inertia seat belt. Suitably, the body comprises a rubber-like material. Alternatively, or in addition, the body comprises a pliable plastics material. Suitably, the body comprises a silicone material.

Suitably, at least part of the cover has a bactericidal coating. Suitably, all the cover has a bactericidal coating. Suitably, the at least part of the cover is impregnated with a bactericidal substance. Suitably, all the cover is impregnated with a bactericidal substance. The bactericidal substance may be ethyl alcohol. Suitably, the cover has a luminous, fluorescent or reflective body. Suitably, the cover has a pressure-activated system; wherein the pressure-activated system senses a user touching the cover. Suitably, in use, the cover emits a sound in response to a user's touch being sensed. Suitably, the sound is a voice sound. Suitably, the voice sound is a safety warning. Alternatively, or in addition the cover lights-up in response to a user's touch being sensed. Alternatively, or in addition the cover may emit bactericidal solution and/or scent in response to a user's touch being sensed. Suitably, the cover is dimensioned to cover a substantial part of a seat belt tongue when in place thereon. Suitably, the cover is dimensioned to cover more than 50% of the exterior of the seat belt tongue when in place thereon.

According to the present invention in a second aspect, there is provided a seat belt tongue comprising a webbing engagement projection arranged in use to contact seat belt webbing and to provide a one-way resistance to drawing of the seat belt webbing through the seat belt tongue.

Suitably, the webbing engagement projection is arranged to provide one-way resistance to drawing of the seat belt webbing through the tongue when the seat belt is fastened in use. Suitably, the webbing engagement projection comprises a friction surface. Suitably, the friction surface comprises one or more compressible elements. Suitably, the friction surface comprises one or more elastically compressible elements. Suitably, each compressible element is a protrusion extending from the webbing engagement projection. The or each protrusion may be one of a nodule, a rib or a ridge. Suitably, the webbing engagement projection is of similar or equal width to the webbing. Suitably, the webbing engagement projection comprises a wedging member arranged to be drawn between the webbing and a webbing slot of the tongue, and to wedge therebetween. Suitably, in cross section the webbing engagement projection comprises a narrower portion arranged in use to lie close to the webbing slot, and a wider portion arranged further away from the webbing slot than the narrower portion. Suitably, the webbing engagement projection in cross section tapers between the narrower portion and the wider portion. Suitably the webbing engagement projection comprises a wider portion that tapers to a narrow portion, the wider portion, narrow portion and taper being provided on a webbing engagement projection base. Suitably, the webbing engagement projection base provides a generally planar surface from which the taper and wider portion extend. Suitably, the generally planar surface lies generally parallel to a plane in use contains the seat belt tongue. Suitably, in cross section the webbing engagement projection is of generally rectangular shape.

Suitably, the webbing engagement projection is arranged in use to contact the lap belt portion of the seatbelt. Suitably, the cover comprises a webbing engagement projection arranged in use to contact the shoulder section of the seat belt. Suitably, the webbing engagement projection is integral with the tongue. Suitably, the webbing engagement projection comprises the same material as the tongue. Suitably, the webbing engagement projection is an extension of the tongue. Suitably, the webbing engagement projection is formed with the tongue as a one-piece moulding. Suitably, the webbing engagement projection comprises no user actuatable parts. Suitably, the webbing engagement portion does not obstruct passage of the webbing through a webbing slot in the tongue, through which the webbing passes, when the webbing is arranged in a plane parallel and passing through the webbing slot but perpendicular to the tongue body. Suitably, the webbing engagement projection serves to narrow the range of angles through which the webbing can be passed unhindered through the webbing slot. Suitably, the webbing engagement projection defines a webbing engagement angle to the webbing slot, at which the webbing engagement projection contacts the webbing. Suitably, the webbing engagement angle is a smaller angle than the angle at which the tongue would contact the webbing, absent of the webbing engagement projection. Suitably, the cover is shaped and dimensioned to allow the seat belt tongue to be moved uninhibited relative to webbing of a seat belt when in place on a seat belt tongue and when the tongue and webbing are arranged at an angle smaller than the webbing engagement angle. Suitably, the engagement angle is less than 30 degrees, preferably less than 25 degrees, more preferably less than 20 degrees, and still more preferably less than 15 degrees. Suitably, the engagement angle is greater than 5 degrees, preferably greater than 10 degrees, more preferably greater than 15 degrees.

Suitably, the tongue comprises one or more secondary belt retaining features, arrangeable in use to urge the webbing toward contact with the webbing engagement projection. Suitably, the tongue comprises a secondary belt retaining feature arrangeable in use to urge the lap belt portion of seat belt webbing toward contact with the webbing engagement projection. Suitably, the secondary belt retaining feature comprises a strap to elastically urge the webbing toward contact with the webbing engagement projection. Suitably, the secondary belt retaining feature is arrangeable in an open configuration in which does not urge the webbing toward contact with the webbing engagement projection, and a closed position in which does urge the webbing toward contact with the webbing engagement projection. Suitably, the secondary belt retaining feature is integral with the tongue. Suitably, the secondary belt retaining feature comprises the same material as the tongue. Suitably, the secondary belt retaining feature is an extension of the tongue. Suitably, the secondary belt retaining feature is formed with the tongue as a one-piece moulding. Suitably, the tongue comprises a webbing engagement portion on both sides thereof. Suitably, the tongue comprises a secondary belt retaining feature in both sides thereof. Suitably, the webbing engagement projection is arranged to contact seat belt webbing when the seat belt is fastened in use and to provide a resistance to drawing of the seat belt webbing through the seat belt tongue by engaging a shoulder section of the seatbelt webbing. Suitably, the webbing engagement projection is arranged to contact seat belt webbing when the seat belt is fastened in use and to provide a resistance to drawing of the seat belt webbing through the seat belt tongue by engaging a shoulder section of a three-point inertia seat belt.

Suitably, the webbing engagement projection comprises part of a cover. Suitably, the cover comprises a deformable body having means for holding the cover on the seat belt tongue, wherein the body is elastically fitted to the seat belt tongue. Suitably, the cover is a cover as described for the first aspect.

According to the present invention there is provided an apparatus and method further as set forth in any appended claims. Other features of the invention will be apparent from any appended dependent claims, and the description which follows.

Figure 3:
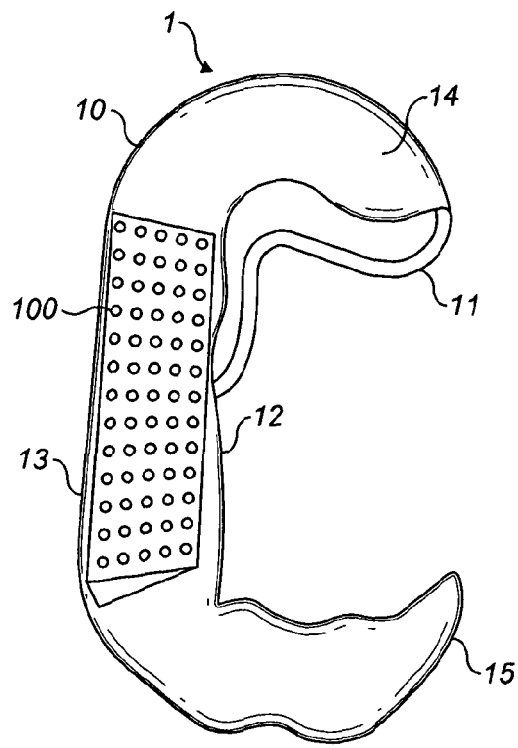
Figure 4A:
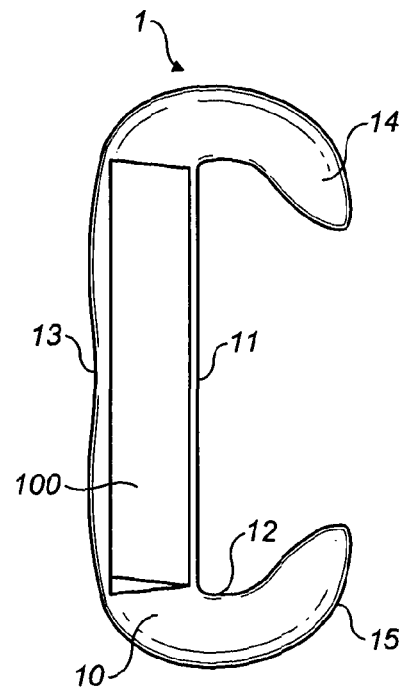
Figure 4B:
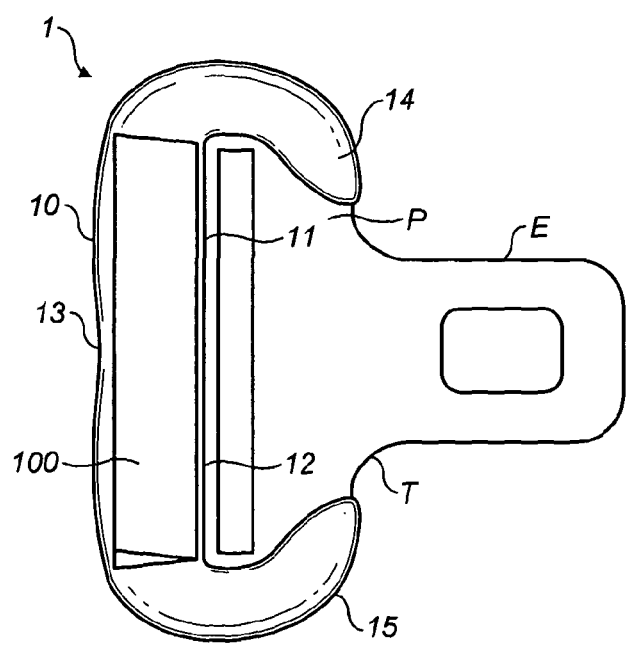
Figure 4C:
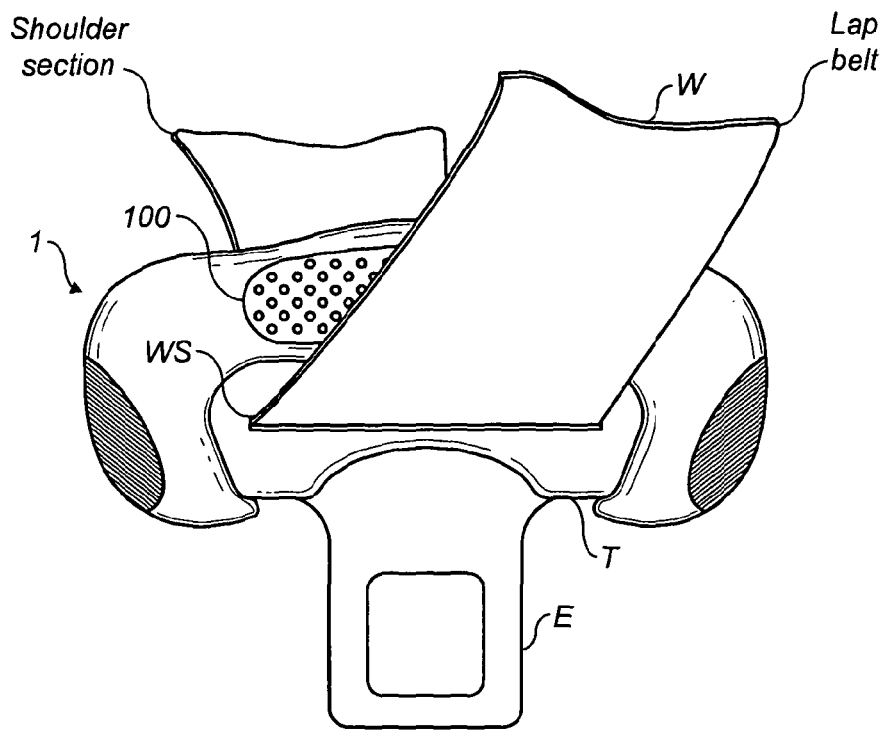
Figure 4D:
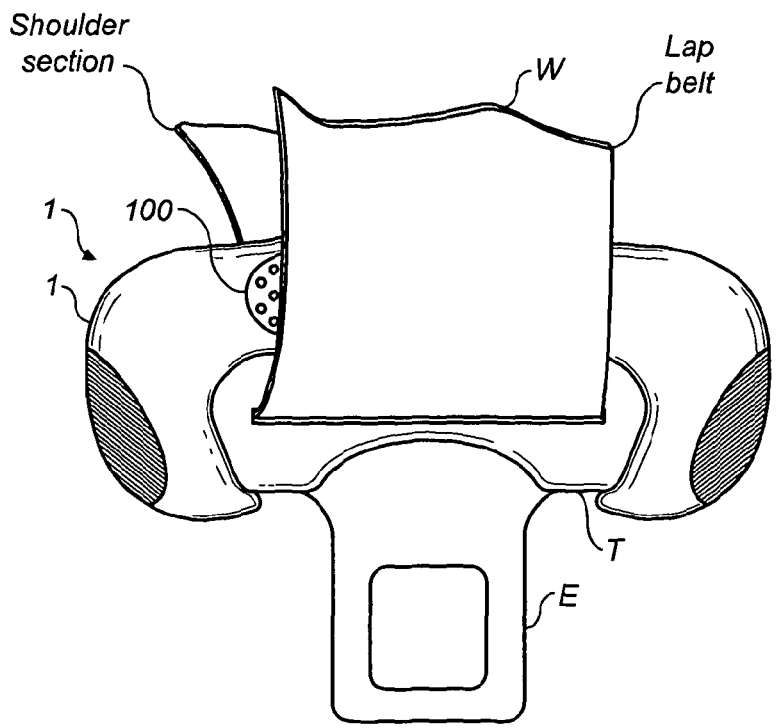
Figure 5:
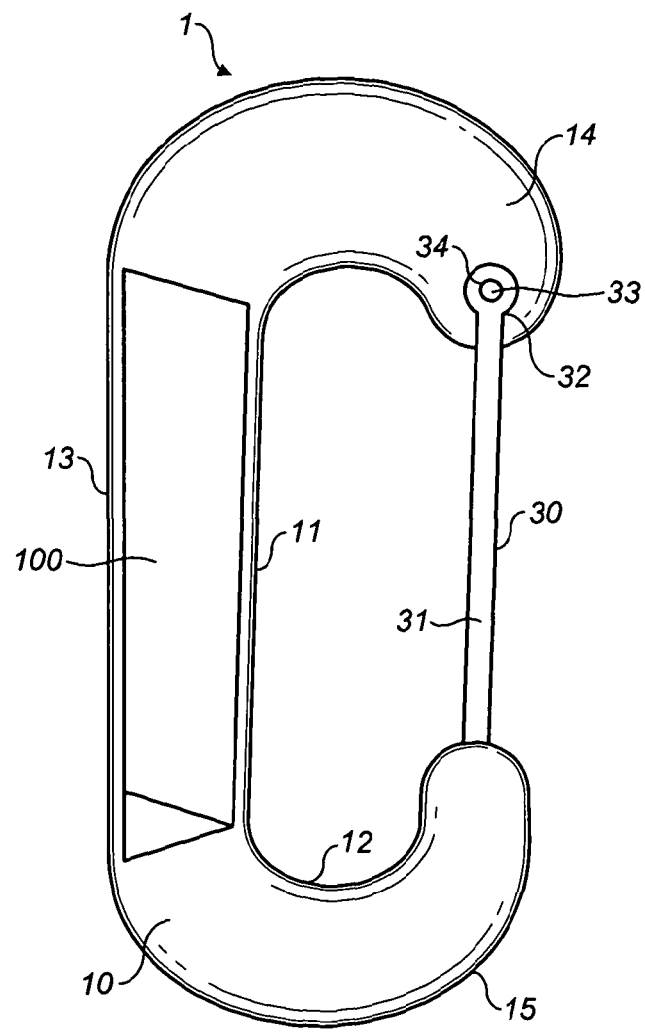
Figure 6A:
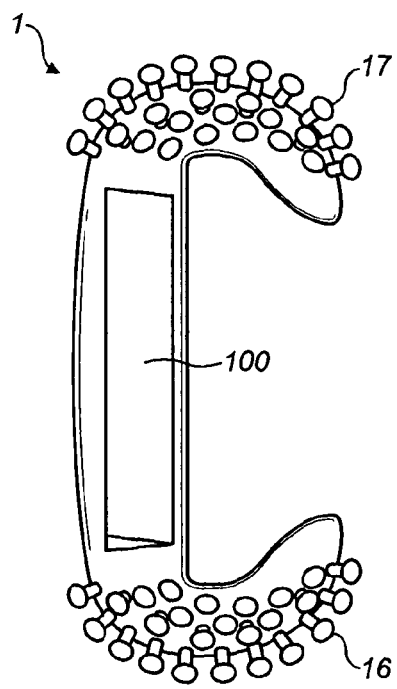
Figure 27:
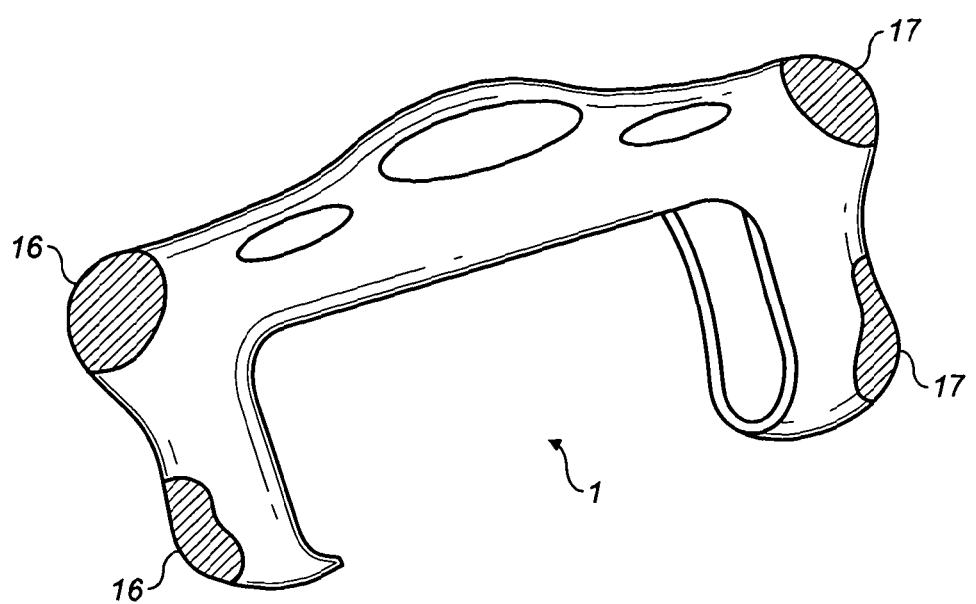

The present invention may be carried out in practice in various ways but a first and several alternative embodiment will now be described, by way of example and with reference to the accompanying drawings, in which:

FIG. 1 shows a typical known seat belt apparatus;
FIG. 2 shows a typical known seat belt tongue;
FIG. 3 shows a perspective view of a cover according to an example embodiment of the present invention;
FIGS. 4*a* and 4*b* show a front view of a cover according to an example embodiment of the present invention before and after being positioned on a seat belt tongue, and FIGS. 4*c* and 4*d* show a rear view of this example embodiment of the present invention after being positioned on a seat belt tongue that is threaded onto a seat belt webbing;
FIG. 5 shows a front view of a cover according to another example embodiment of the present invention;
FIGS. 6*a*-6*g* show front views of further alternative example embodiments of the present invention;
FIG. 7 shows a rear view of the embodiment of FIG. 6*g*;
FIGS. 8-26 show a further example embodiments of the present invention in use with a seat belt apparatus; and
FIG. 27 shows a further example embodiment of the present invention.

FIG. 3 shows a cover 1 for covering a seat belt tongue T. The cover 1 has an elastically deformable body 10 to allow it to be easily fitted to and removed from a tongue T as required. The cover 1 is stretchable to envelop a portion of the tongue T, but when released contracts toward its original un-stretched shape. In use, the cover 1 is attached to the tongue T and improves the ability of the user to grasp that tongue T and arrange the seatbelt SB associated with the tongue T for his or her protection during a crash. Furthermore, the cover 1 comprises a webbing engagement projection 100. The webbing engagement portion 100 is arranged to resist movement of the webbing relative to the tongue T when the seat belt SB is fastened in use. Proper use of the inertia reel seat belt involves the user (i) sitting well back in the seat, (ii) buckling up, ensuring the webbing is not twisted and the lap belt is laying across the hip bone (not the stomach) and (iii) removing the slack from the lap belt portion by gently pulling up on the shoulder section of the seatbelt webbing. When the seat belt SB is in use the webbing contacts the webbing engagement projection 100 and provides a frictional resistance thereto.

The position and size of the webbing engagement projection 100 are such that the tongue T is able to freely slide over the webbing to allow the seatbelt SB to be fastened with the tongue T in the buckle B. Once fastened, in accordance with safety guidelines the slack is removed from the lap belt portion of the seat belt SB by pulling up on the shoulder section of the seat belt SB. Initially, tension is maintained in the seatbelt by the inertia reel spring. Removing the slack from the lap belt portion of the seat belt SB is important to ensure that it rests over the pelvis and hips of the wearer, rather than the abdomen. The former set up is that used when conducting crash tests for EuroNCAP, NCAP and other safety organisations.

Movement of the wearer may serve to loosen the shoulder section and lap belt section, leading to the lap belt section riding up onto the abdomen of the wearer with a consequent reduction in protection provided by the seatbelt SB and very different dynamics of movement compared to the crash test situation using ATDs (Crash Test 'Dummies'). However, cover 1 comprising the webbing engagement projection 100 serves to maintain tension in the lap belt section, and to prevent any slack in the shoulder section being transferred through the tongue to the lap belt section. As the lap belt and/or shoulder section of webbings are flexed in use across the wearer's body they press against the webbing engagement projection, giving rise to the functional resistance against movement of the webbing through the webbing slot.

The body 10 has an external surface and an internal surface. The internal surface comprises a channel 11 that is accessed through an opening 12 in the body 10. The channel 11 is shaped and dimensioned to in use receive a tongue T. The external surface includes the webbing engagement projection 100. In use, the body 10 is stretched to allow the tongue T to be inserted through the opening 11 into the channel 12, and then the body 10 is released to elastically secure the cover 1 onto the tongue T.

FIG. 3 shows that the body 10 has a spine 13 from which first and second hooked portions 14, 15 extend. The spine 13 and hooked portions 14, 15 are dimensioned to allow the cover 1 to elastically fitted to a plastic part P of the tongue T, so that the cover 1 is hooked over the tongue T and held in place. The cover 1 of FIG. 3 has a pattern provided on the webbing engagement projection 100 to provide suitable friction characteristics between the cover 1 and the webbing W when in use.

FIGS. 4a to 4d show how according to another example embodiment the cover is fitted to the tongue T, and how the tongue is fitted to webbing. The cover 1 is selected by a user then stretched in preparation for attachment to the tongue T. The user inserts the tongue T through the opening 12 into the channel 11. The hooked portions 14, 15 are positioned around the ends of the tongue T. After the user has positioned the hooked portions 14, 15, and they are released to contract around the tongue T. The contraction of the hooked portions 14, 15 draws the cover 1 onto the tongue T, where it is held in position as shown by FIG. 4b.

The example embodiments shown are intended to be fitted onto any standard size or shape of 'single pass' seat belt tongue.

FIG. 5 shows a second embodiment of a cover of the present invention having all the features of the first embodiment and a securement means 30. The securement means 30 is a strap 31 and a fastening means 32. The strap 31 is located in an end region of one the hooked portion 15, and the fastening means 32 is located in an end region of the other hooked portion 14. The strap 31 is fitted to the fastening means 32, in use, after the cover has been fitted on the tongue. The securement means 30 provides and additional means for securing the cover to the tongue 7.

The fastening means is a combination of a protrusion 33 extending from the hooked portion 14 and an aperture 34 located at or near the distal end of the strap 31, i.e., the aperture 34 is located at the end of the strap 31 that is not attached to the hooked portion 15. In use, the strap 31 is secured by stretching and then slot-fitting the protrusion 33 into the aperture 34.

Although FIG. 5 shows only one strap 31 and fastening means 32, it is possible to provide more than one strap, for example two straps, one on either side of the cover 1.

After the cover 1 has been positioned on the tongue T, a user is able to grab the cover 1 to draw the webbing W across their body and insert the extension E into the buckle B. The cover 1 is fabricated from or with a covering of a rubbery or, suitable, pliable plastics material, such as silicone elastomers. The cover 1 is slightly squashed under the grasp of a user, which generates more friction between the user's fingers than would be the case with the normal hard plastic P of the known tongue T shown in FIG. 2. The increase of friction results in it being less likely that the tongue T will inadvertently slip from a user's grasp and cause less damage should the tongue be trapped in the vehicle door or under the seat.

FIGS. 3, 4a, 4b and 5 show embodiments of the cover having a smooth external surface away from the webbing engagement projection 100. FIGS. 6a to 6d show alternative embodiments of the cover having textured regions 16, 17 separated by an intermediate region. The textured regions 16, 17 are provided to increase the friction between a user's fingers and the cover 1. The textured regions 16, 17 provide a roughened surface in the areas of the cover 1 that a user is likely to grasp when drawing the webbing W from the inertia reel I.

FIGS. 6a-6d show examples of patterns comprising nodules, ribs, ridges and other protrusions that form the textured regions 16,17. The different exemplary patterns are provided on the external surface of the cover 1. The patterns provide a surface that allows a user to easily grasp and manipulate the covered tongue, making it easier to manipulate the tongue whilst reducing the potential for it to slip from a user's grasp.

Figure 6B:
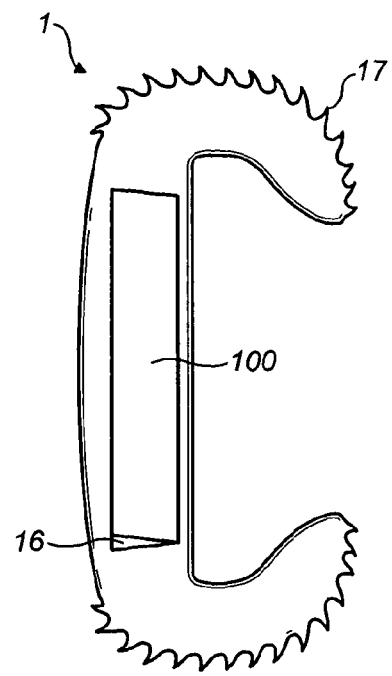
Figure 6C:
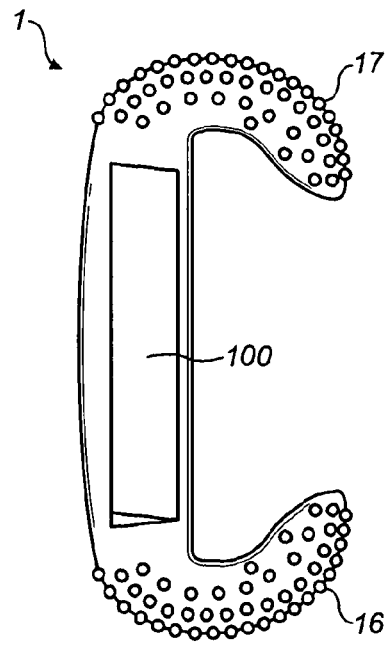
Figure 6D:
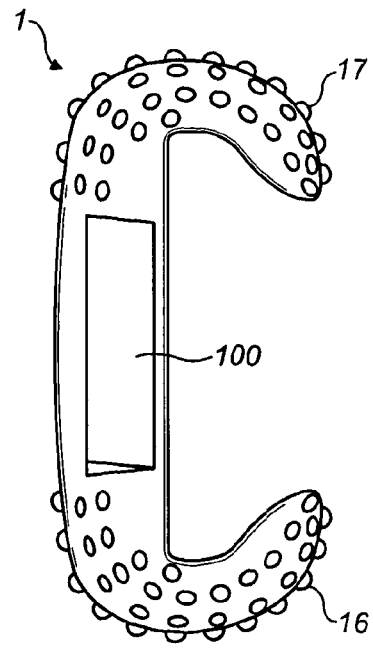
Figure 6E:
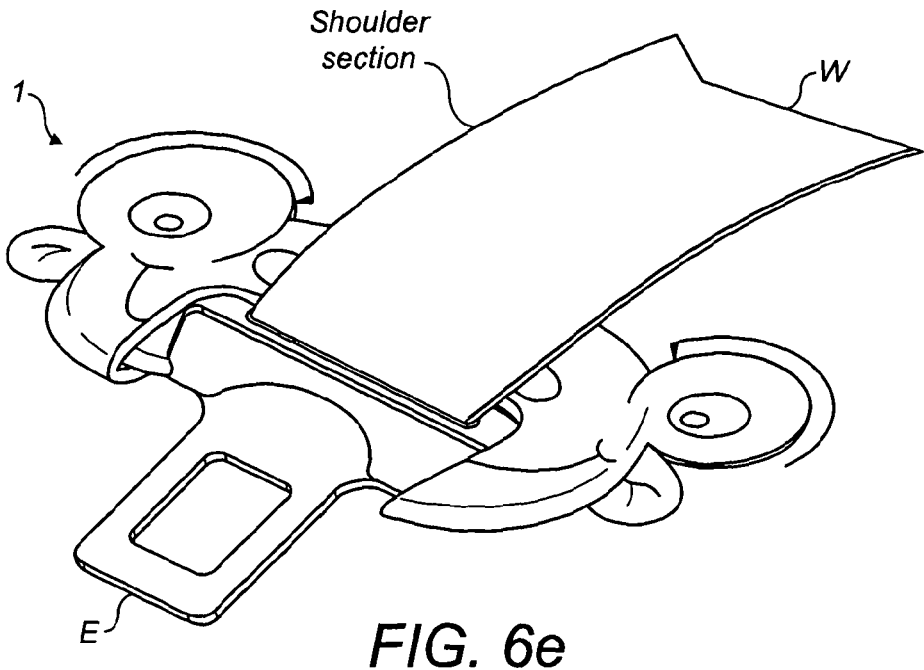
Figure 6F:
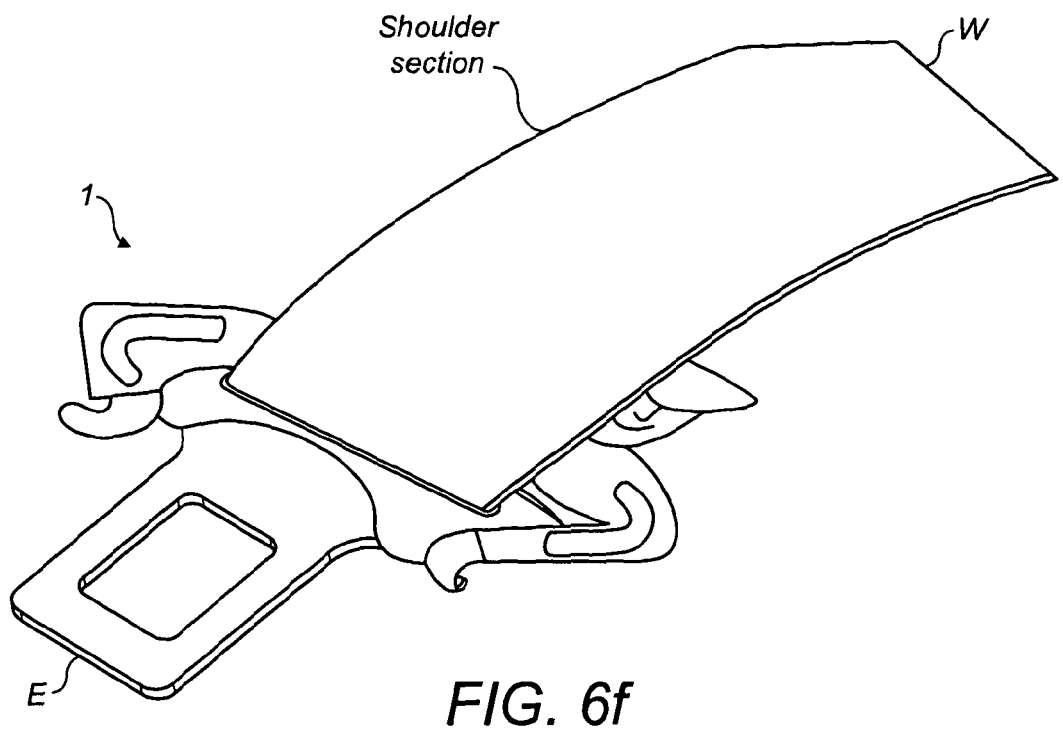
Figure 6G:
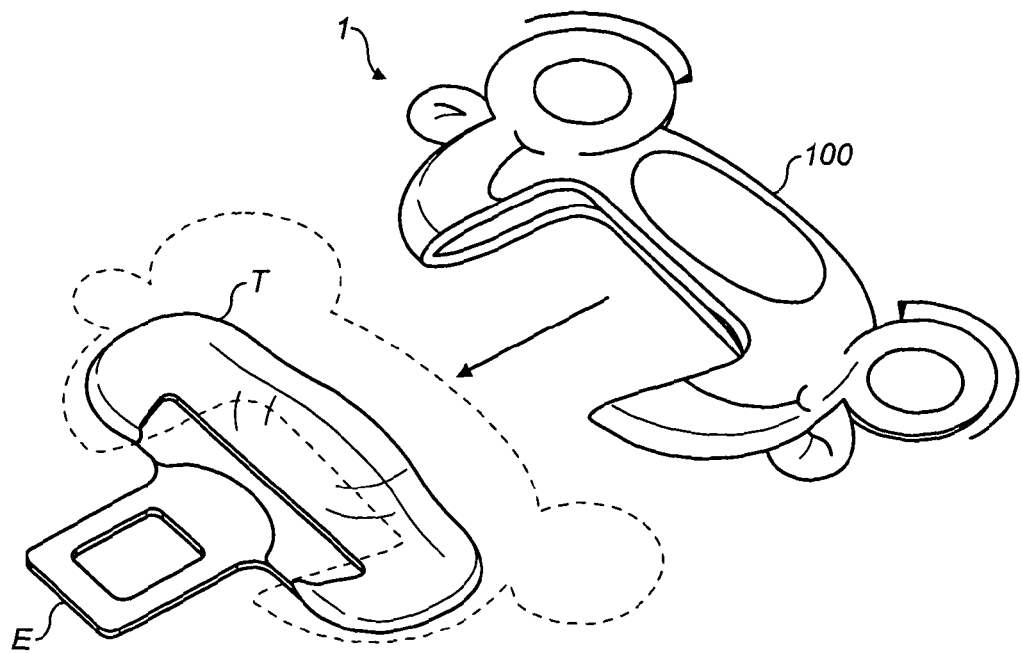
Figure 7:
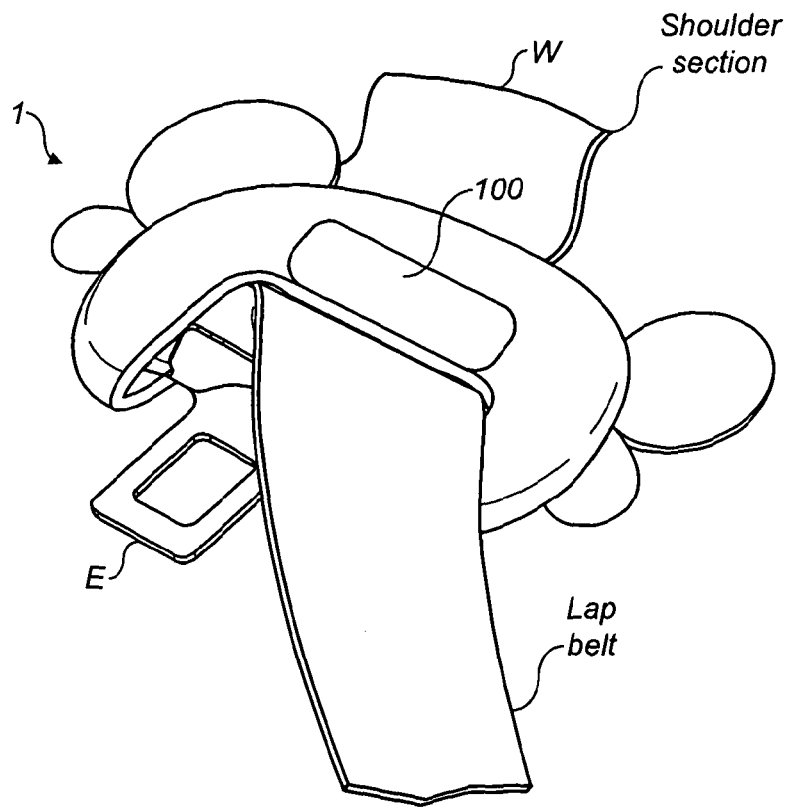

FIG. 6b shows the pattern as being a series of saw-tooth ridges or ribs on the edges of the cover 1. Figure 6c shows the pattern as being a series of small nodules in the edge regions of the cover 1. The small nodules each form a rounded, hemispherical, protrusion. FIG. 6d shows the pattern as being a series of large nodules in the edge regions of the cover 1. The large nodules each form a raised protrusion. FIG. 6a shows the pattern as being a series of mushroom-shaped protrusions extending from the edge regions of the cover 1. FIG. 6e shows children's versions of the cover 1 designed to appeal to young people and thereby additionally incentivise and assist children to buckle up (including when in booster seats). FIGS. 6a-6d also show the webbing engagement projection 100 on the intermediate region that separates the textured regions 16, 17.

Webbing engagement projections may conveniently be provided on both front and rear faces of the cover in order that the lap belt and shoulder sections of the belt may contact webbing engagement projections in use, or so that the cover 1 is effective when fitted either way up.

In use, the protrusions will be compressed or squashed by the user's fingers as they are grasped. This ability to become squashed tends to flatten the protrusions relative to the body and increase the surface area that is manipulated by the user. This has the effect of increasing the friction generated between the covered tongue and the user's fingers. The increased friction results in it being less likely that a tongue will inadvertently be released from a user's grasp. Furthermore, the webbing engagement projection may suitably comprise similar protrusions to those provided on the end regions, in order to control the friction between the webbing and the webbing engagement projection in use.

In a further exemplary embodiment (not shown), in addition to the features of the cover 1 described for the first, second and alternative embodiments, the cover 1 comprises a pressure activated system. The pressure activated system senses a user touching the cover and responds by emitting a voice sound such as the voice phrase "please ensure seat belt webbing is not twisted" and/or "please ensure the slack is taken out of the lap belt" through a speaker unit housed in the cover 1. The pressure activated system can also emit scent and/or bactericidal solution and/or emit a light and/or cause the cover 1 to glow to indicate that the cover 1 has been touched. The pressure activated system provides a useful safety feature reminding a user of the importance of correctly fitting a seat belt.

With the cover 1 positioned, as shown by FIG. 4b, an easily cleanable surface is provided. The cover 1 can be washed in position on the tongue T. The cover 1 can also be removed from, washed and disinfected independently of the tongue T, before being repositioned. This ability allows the cover 1 to provide a surface that can be used to reduce the spread of diseases and infections.

To improve the cover's ability to minimise the spread of diseases and infections, the cover 1 is impregnated with a bactericidal substance, for example, ethyl alcohol.

The external surface of the body 10 is fabricated or coated with a fluorescent, luminous and/or reflective material to provide a covered tongue having increased visibility to a user. In this way, the cover 1 allows a user to more easily locate the tongue, especially at night.

The external surface of the cover 1, in an exemplary embodiment (not shown), is adapted to carry graphics or other decoration intended to appeal to young drivers. This adaptation may serve to encourage seat belt use and thereby reduce the likelihood of a serious injury being caused as a result of a crash.

Figure 8:
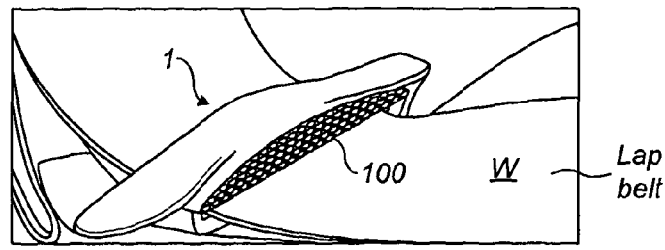
Figure 9:
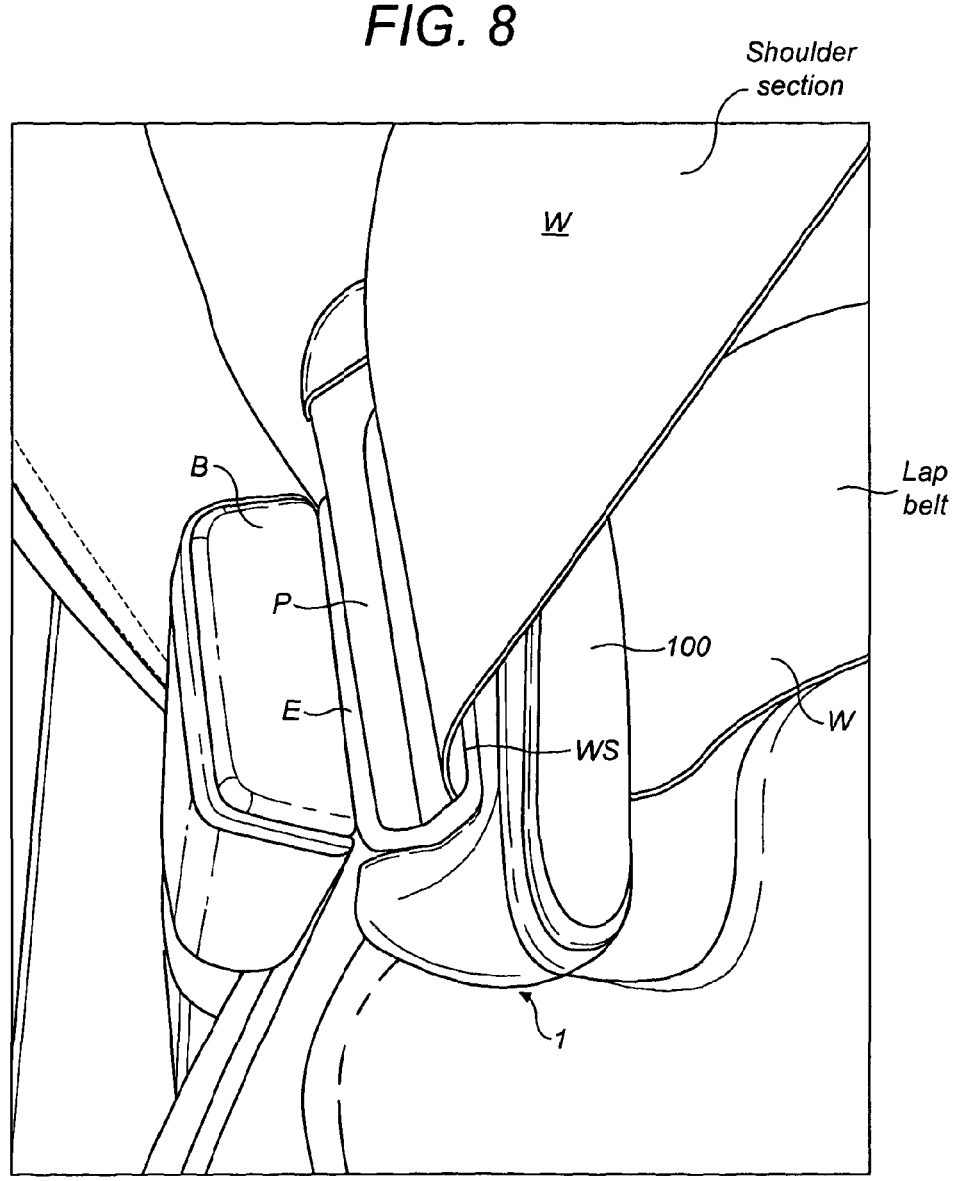
Figure 10:
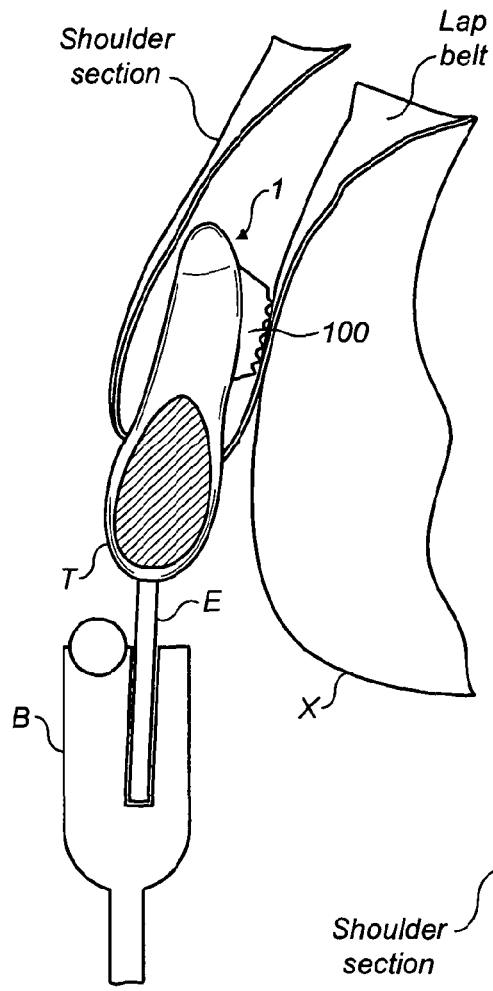
Figure 11:
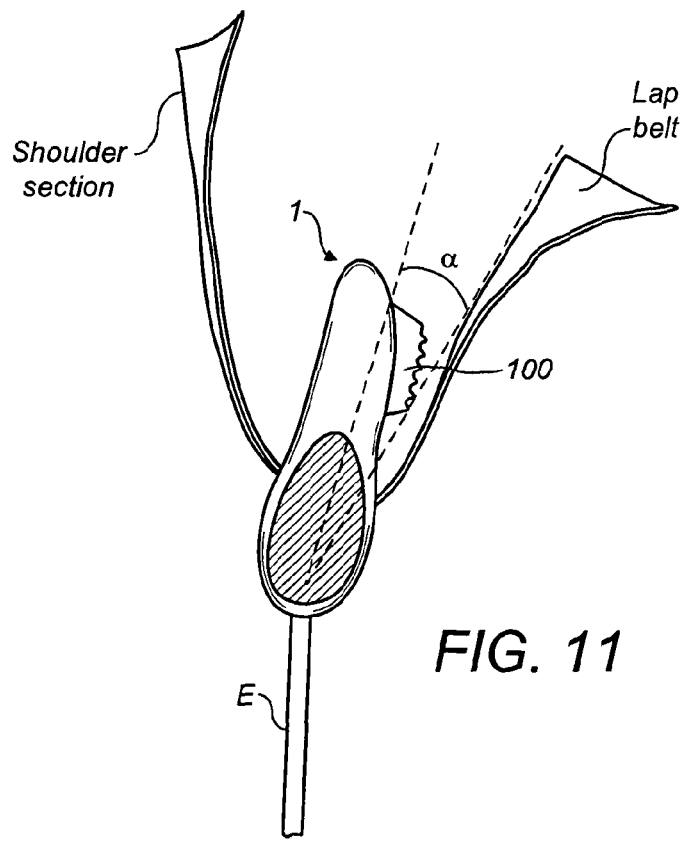

FIGS. 8-10 show the cover 1 in place on a tongue T and with a seat belt including the tongue T being worn. In FIG. 9 the shoulder section contacts the webbing engagement projection 100. In FIG. 8 the lap belt would contact the webbing engagement projection 100, but has been pulled down to illustrate the position of the webbing engagement projection more clearly. FIG. 10 shows the lap belt contacting the webbing engagement projection 100, and also shows the body X of the wearer of the seatbelt, which in this instance also serves to urge the webbing W toward the webbing engagement projection. FIG. 11 shows the webbing engagement angle alpha, which is measured along the axis of the tongue T and from the point at which the webbing W turns through the webbing slot WS, such that the angle is the minimum angle that the webbing may adopt before engaging the webbing engagement projection.

Figure 12:
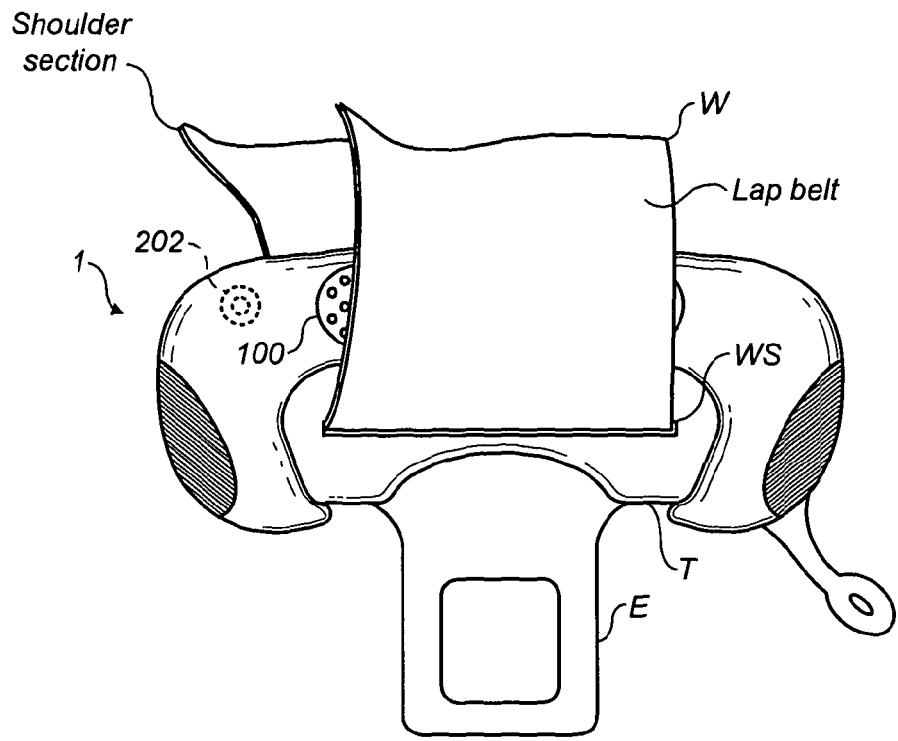
Figure 13:
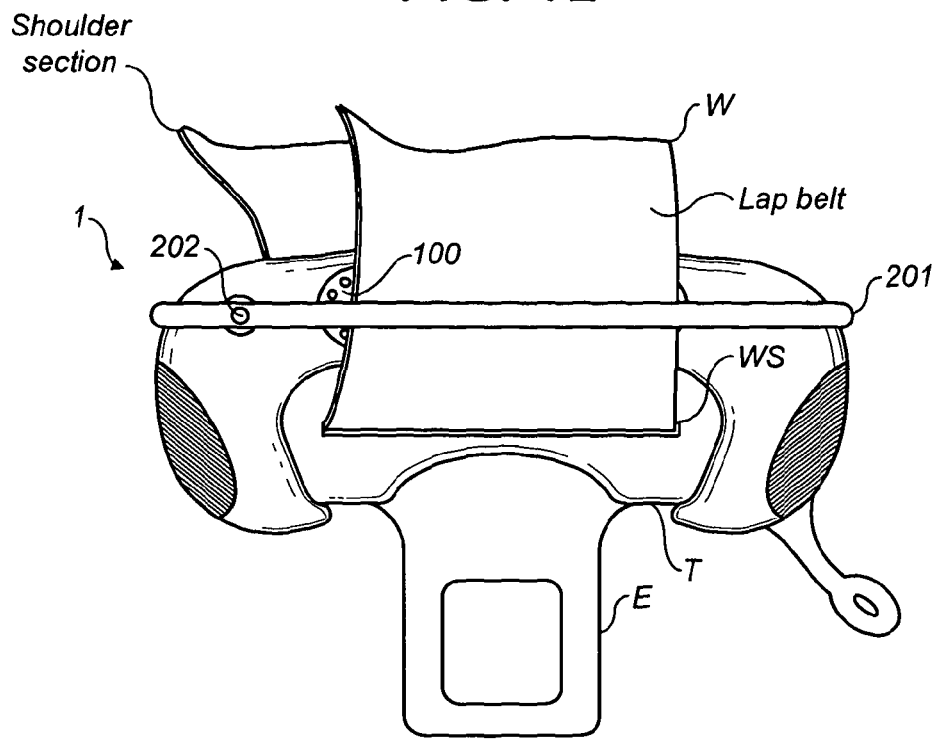
Figure 14:
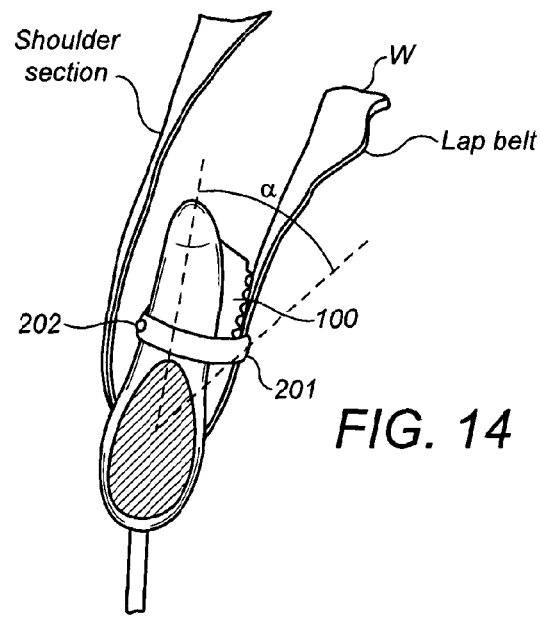
Figure 15:
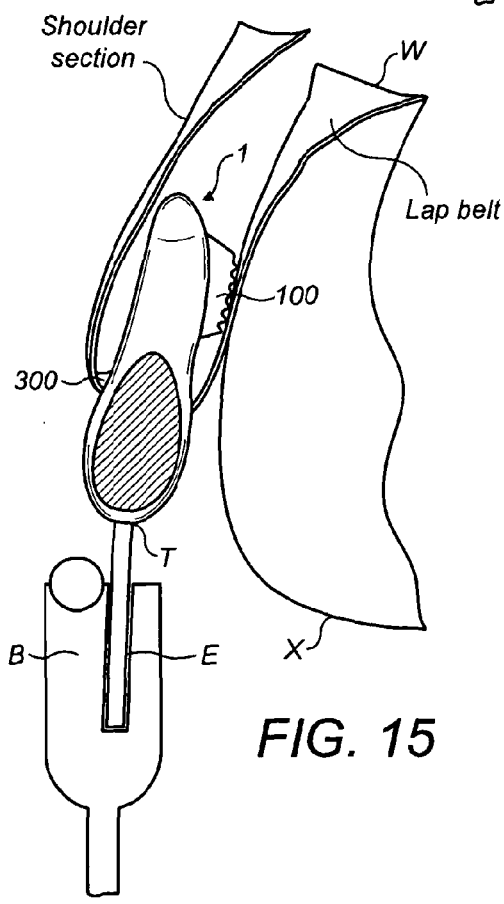
Figure 16:
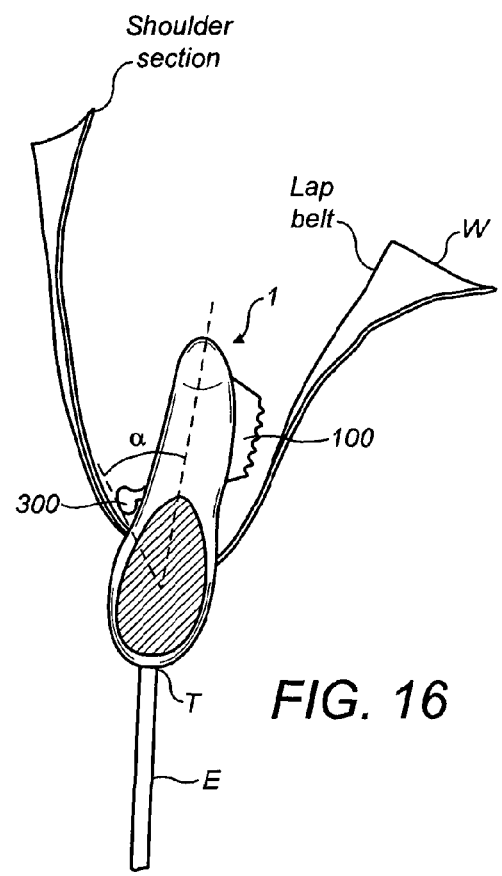
Figure 17:
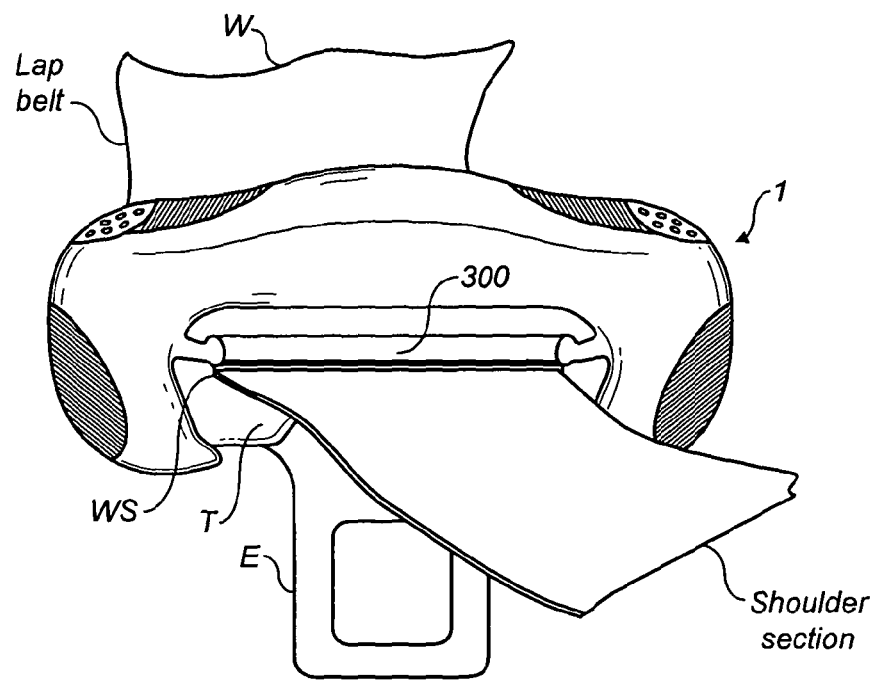
Figure 18:
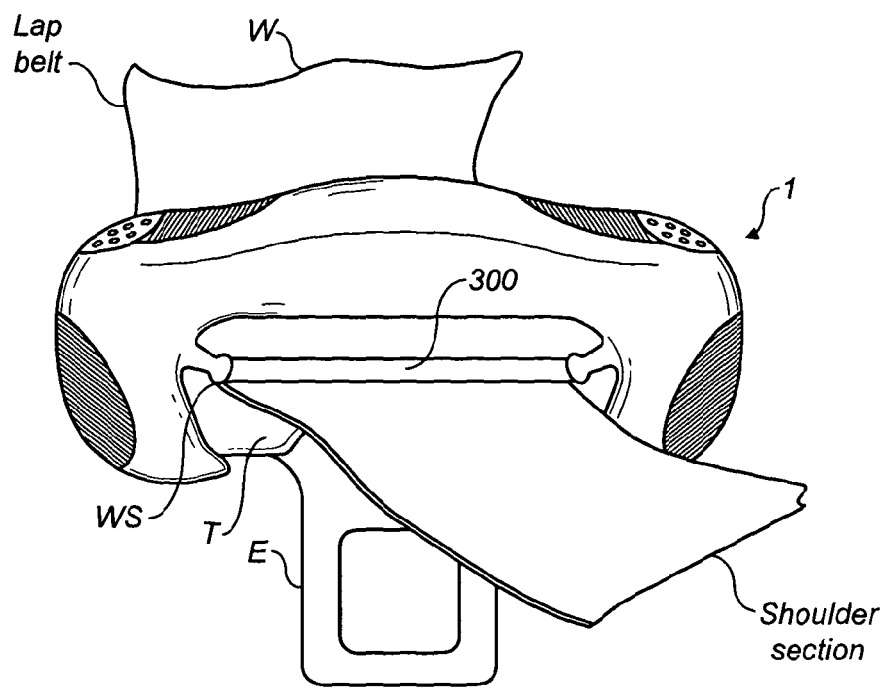
Figure 19:
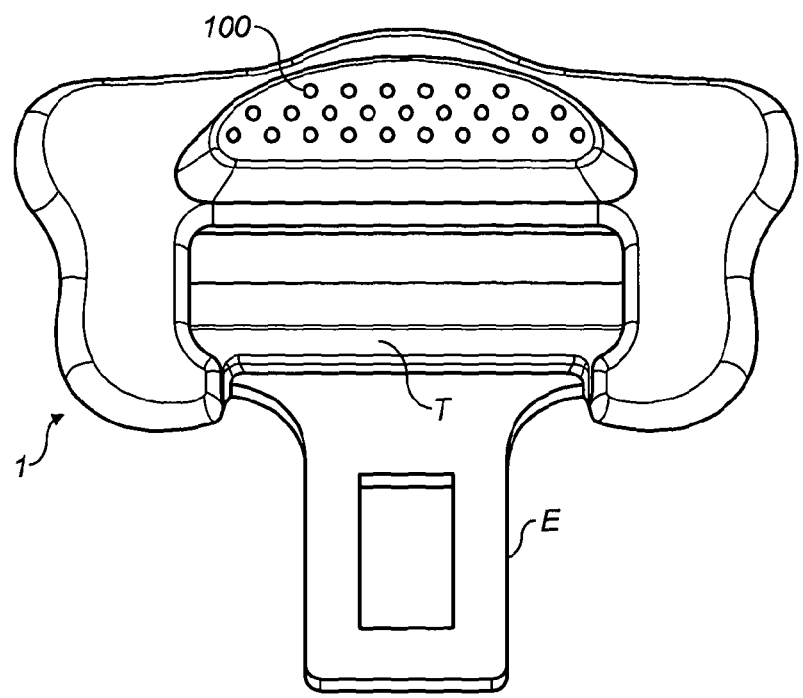
Figure 20:
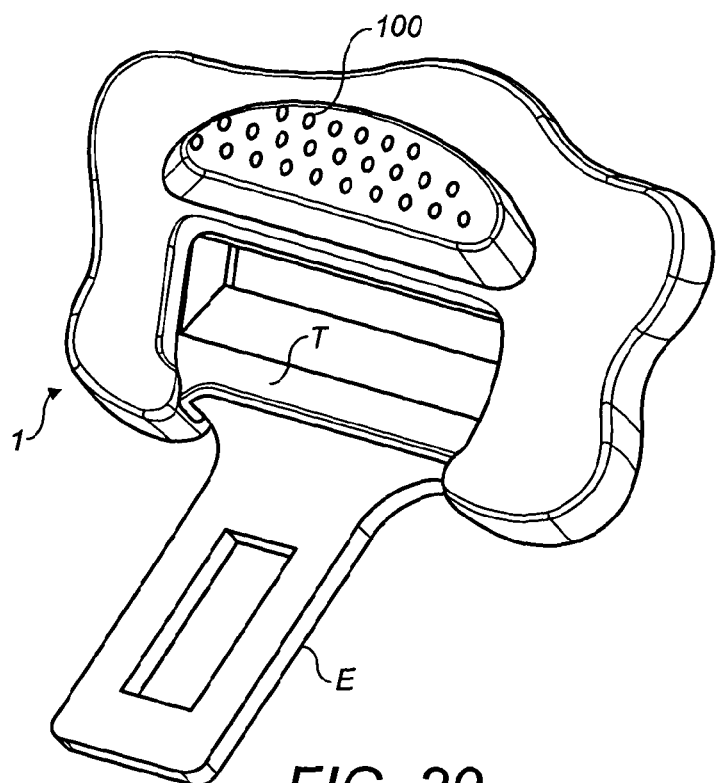
Figure 21:
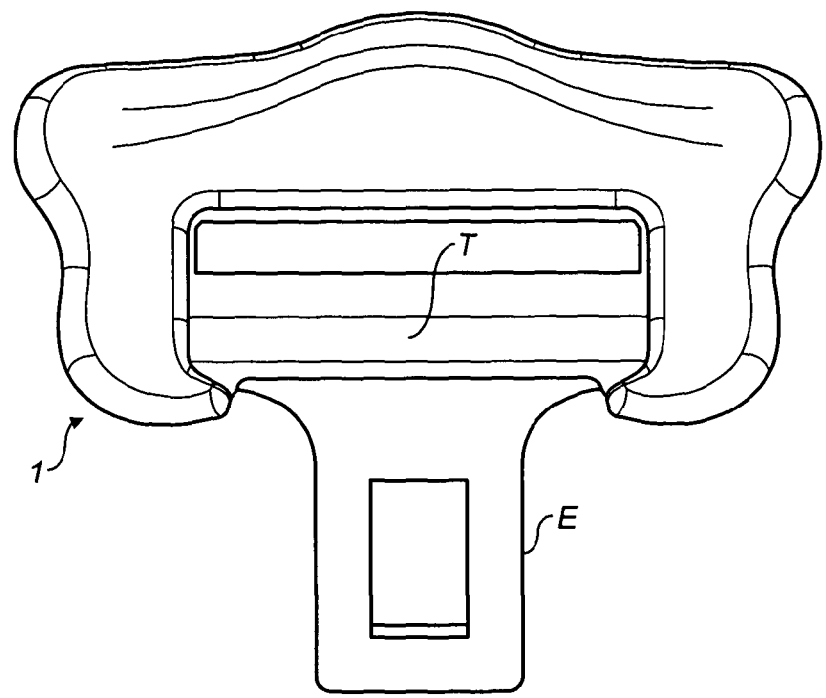
Figure 22:
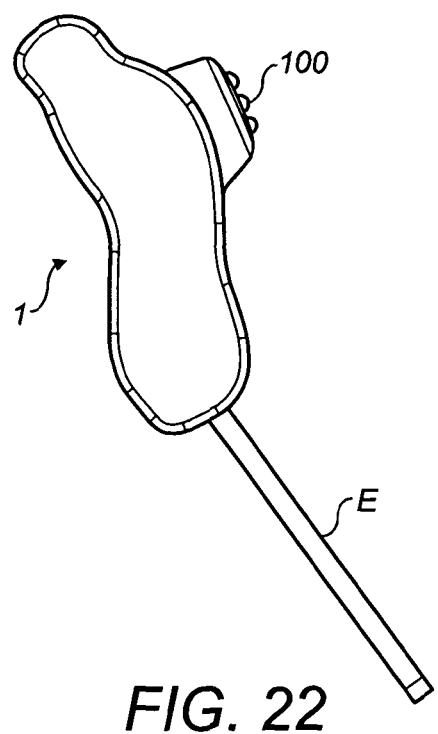
Figure 23:
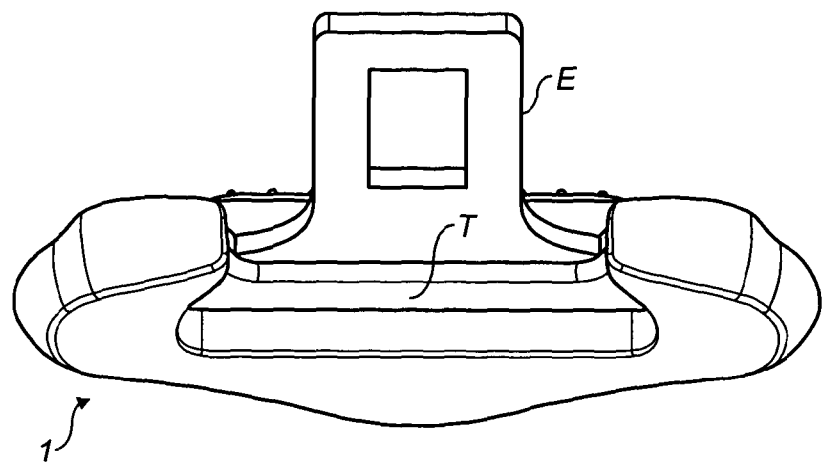
Figure 24:
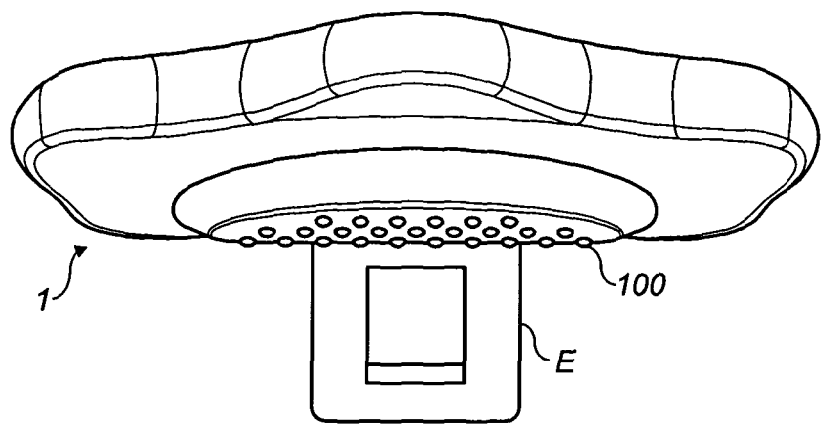
Figure 25:
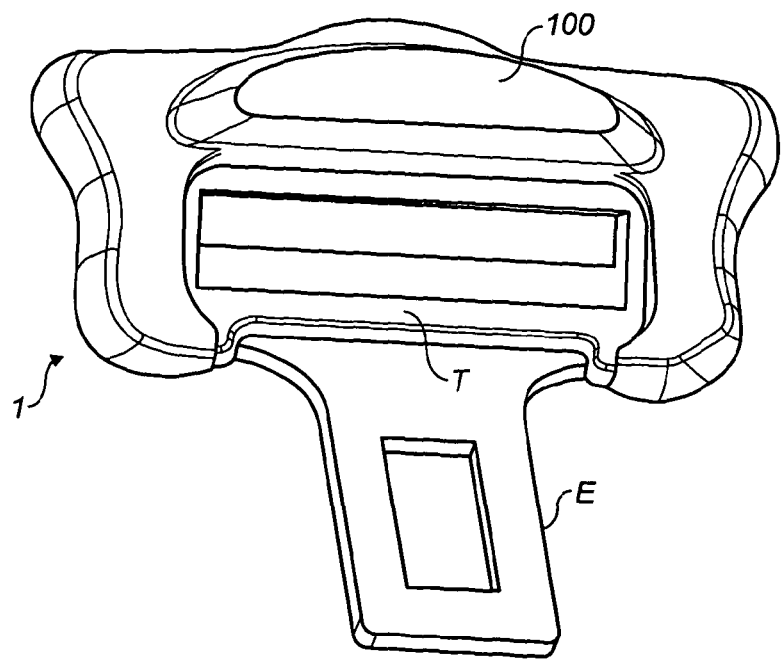
Figure 26:
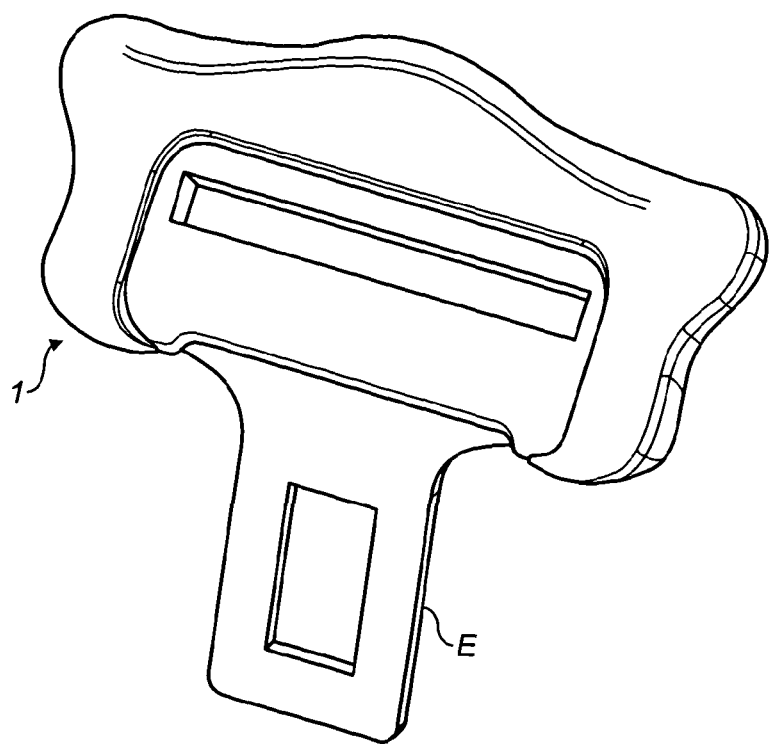

FIGS. 12-14 show a further example embodiment of the cover 1 comprising a secondary belt retaining features 201, 202. The secondary belt retaining feature 201,202 is arrangeable in use to urge the webbing W toward contact with the webbing engagement projection 100, as shown in FIGS. 13 and 14. The secondary belt retaining feature comprises a strap 201 to elastically urge the webbing W toward and into contact with the webbing engagement projection 100. FIG. 12 shows the secondary belt retaining feature 201,202 in an open configuration in which does not urge the webbing W toward contact with the webbing engagement projection. To close the secondary belt retaining feature 201,202 the strap 201 is pulled around the webbing W and the tongue T and attached to a fixing point 202. Suitably, the fixing point is located on the opposite side of the cover 1 to the side on which the strap 201 is carried.

FIGS. 15-18 show a further example embodiment of the cover 1 comprising a webbing engagement projection in the form of a wedging member 300 arranged to be drawn between the webbing W and the webbing slot WS of the tongue T, and to wedge therebetween. FIGS. 19-24 and 25-26 respectively show further example embodiments of the cover 1. In these embodiments the webbing engagement projection 100 is arranged to extend from a webbing engagement projection base. The embodiment of FIGS. 19-24 comprises a bumpy, textured surface to the wedging member 300, whereas there are no modules or other visible surface features on the wedging member 300 of the embodiment of FIGS. 25-26. FIG. 27 shows a cover 1 in which a strong, resilient core provided, for example as a two-part moulding with relatively more elastic, extensible material provided in the hooked portions 14, 15.

The cover 1 is easy to fix to an existing tongue T and can be used to overcome various problems associated with the known tongues. Furthermore, the cover 1 is easy to fix in position and is able to be retrofitted to a whole fleet of cars, such as a fleet of hire cars. The features of the cover may also be advantageously integrated with tongues on manufacture (Original Equipment Manufacture; OEM).

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed, including the OEM versions.

The invention claimed is:

1. A cover for a seat belt tongue, comprising:
   an elastically deformable body configured to hold the cover onto the seat belt tongue; and
   a webbing engagement projection configured to contact seat belt webbing, and to provide a resistance to drawing of the seat belt webbing through the seat belt tongue,
   wherein the webbing engagement projection projects from a surface which is substantially parallel to a seat belt tongue extension configured to be inserted into a buckle for fastening the seat belt tongue,
   wherein a cross section of the webbing engagement projection comprises a narrower portion configured, in use, to lie close to a webbing slot in the seat belt tongue through which the seat belt webbing passes, and a wider portion disposed further away from the webbing slot than the narrower portion, such that the webbing engagement projection in cross section tapers between the narrower portion and the wider portion, and
   wherein, in use, the webbing engagement projection serves to narrow a range of angles through which the seat belt webbing is passed unhindered through the webbing slot.

2. The cover of claim 1, wherein the elastically deformable body is stretched, in use, to be elastically-fitted to the seat belt tongue.

3. The cover of claim 1, wherein the elastically deformable body comprises:
   first and second hooked portions configured to hook around the seat belt tongue to hold the cover in position, the first and second hooked portions located at opposite end regions of the elastically deformable body; and
   a channel configured to receive and hold the seat belt tongue.

4. The cover of any claim 1, wherein the elastically deformable body comprises:
   a first textured region configured to be gripped by a user; and
   a second textured region distinct from the first textured region, the first and second textured regions separated by an intermediate region, and the intermediate region provided in a region at which the seat belt webbing runs when the cover is in place on the seat belt tongue.

5. The cover of claim 4, wherein the webbing engagement projection is provided at the intermediate region.

6. The cover of claim 1, wherein the webbing engagement projection comprises a friction surface.

7. The cover of claim 6, wherein the friction surface comprises compressible elements in the form of protrusions extending from the webbing engagement projection.

8. The cover of claim 1, wherein the webbing engagement projection is of similar or equal width to the seat belt webbing.

9. The cover of claim 1, wherein the webbing engagement projection comprises a wedging member configured to be drawn between the seat belt webbing and a webbing slot of the seat belt tongue, and to wedge therebetween.

10. The cover of claim 1, wherein the wider portion and the narrow portion are disposed on a webbing engagement projection base.

11. The cover of claim 10, wherein the webbing engagement projection base comprises an approximately planar surface from which the wider portion extends, the approximately planar surface being parallel to a plane that, in use, comprises the seat belt tongue.

12. The cover of claim 1, wherein the webbing engagement projection is integral with the elastically deformable body.

13. The cover of claim 1, wherein the webbing engagement projection is configured, in use, to not obstruct passage of the seat belt webbing through a webbing slot in the tongue, through which the seat belt webbing passes, when the seat belt webbing is disposed in a plane parallel to and passing through the webbing slot and perpendicular to the seat belt tongue.

14. The cover of claim 13, wherein, in use, the webbing engagement projection defines a webbing engagement angle to the webbing slot, at which the webbing engagement projection contacts the seat belt webbing, the webbing engagement angle being smaller than an angle at which the seat belt tongue would contact the seat belt webbing, absent the cover and the webbing engagement projection.

15. The cover of claim 14, wherein the cover is shaped and dimensioned to allow the seat belt tongue to be moved uninhibited relative to the seat belt webbing when the cover is in place on the seat belt tongue and when the seat belt tongue and the seat belt webbing are disposed at an angle smaller than the webbing engagement angle.

16. The cover of claim 14, wherein the webbing engagement angle is less than 30 degrees.

17. A seat belt tongue comprising:
   a webbing engagement projection configured, in use, to contact seat belt webbing, and to provide a one-way resistance to drawing of the seat belt webbing through the seat belt tongue,
   wherein the webbing engagement projection projects from a surface which is substantially parallel to a seat belt tongue extension configured to be inserted into a buckle for fastening the seat belt tongue,
   wherein a cross section of the webbing engagement projection comprises a narrower portion configured, in use, to lie close to a webbing slot in the seat belt tongue through which the seat belt webbing passes, and a wider portion disposed further away from the webbing slot than the narrower portion, such that the webbing engagement projection in cross section tapers between the narrower portion and the wider portion, and
   wherein, in use, the webbing engagement projection serves to narrow a range of angles through which the seat belt webbing is passed unhindered through the webbing slot.

\* \* \* \* \*